(12) United States Patent
Løseth et al.

(10) Patent No.: US 12,092,325 B2
(45) Date of Patent: Sep. 17, 2024

(54) OFFSHORE CARBON CAPTURE AND INJECTION METHOD AND SYSTEM

(71) Applicant: Stena Power & LNG Solutions AS, Grimstad (NO)

(72) Inventors: Robert Løseth, Oslo (NO); Svein Borge Hellesmark, Fevik (NO)

(73) Assignee: Stena Power & LNG Solutions AS, Grimstad (NO)

(*) Notice: Subject to any disclaimer, the term of this patent is extended or adjusted under 35 U.S.C. 154(b) by 0 days.

(21) Appl. No.: 18/433,829

(22) Filed: Feb. 6, 2024

(65) Prior Publication Data

US 2024/0175575 A1    May 30, 2024

Related U.S. Application Data

(60) Division of application No. 18/497,765, filed on Oct. 30, 2023, which is a continuation of application No.
(Continued)

(51) Int. Cl.
 *F23J 15/00* (2006.01)
 *E21B 41/00* (2006.01)

(52) U.S. Cl.
 CPC ........... *F23J 15/00* (2013.01); *E21B 41/0064* (2013.01); *F23J 2215/50* (2013.01); *F23J 2219/00* (2013.01); *F23J 2900/00* (2013.01)

(58) Field of Classification Search
 CPC ...... F23J 15/00; F23J 2215/50; F23J 2219/00; F23J 2900/00; E21B 41/0064
 See application file for complete search history.

(56) References Cited

U.S. PATENT DOCUMENTS 8,683,823 B1 * 4/2014 Shivers, III ............ F25J 1/0283
114/230.17
8,872,377 B2 * 10/2014 Yu ............................ B60M 3/04
307/9.1
(Continued)

FOREIGN PATENT DOCUMENTS

EP    3812033 A1    4/2021
JP    61108851 A  *  5/1986  ............... F02G 5/02
(Continued)

OTHER PUBLICATIONS

English Translation JP-61108851-A (Year: 1986).*
International Search Report issued for International Patent Application No. PCT/NO2023/050039, dated Jun. 16, 2023.

*Primary Examiner* — Shafiq Mian
(74) *Attorney, Agent, or Firm* — Haynes and Boone, LLP

(57) ABSTRACT

A system for offshore, direct carbon dioxide sequestration includes an offshore marine platform fixed to the ocean floor above an offshore, subsea storage reservoir. A carbon dioxide floating storage unit moored adjacent the marine platform gathers and stores carbon dioxide delivered in discreet amounts from carbon dioxide sources. Carbon dioxide sources may include carbon dioxide delivery vessels and a carbon dioxide capture system mounted on the marine platform. Once a desired volume of carbon dioxide has been gathered in the carbon dioxide floating storage unit, compressors in fluid communication with the carbon dioxide floating storage unit may be utilized to increase the pressure of the gathered carbon dioxide to a desired injection pressure, after which the pressurized carbon dioxide is pumped directly from the fixed marine platform into the subsea storage reservoir.

19 Claims, 11 Drawing Sheets

Related U.S. Application Data

17/820,639, filed on Aug. 18, 2022, now Pat. No. 11,873,991.

(60) Provisional application No. 63/362,171, filed on Mar. 30, 2022.

(56) References Cited

U.S. PATENT DOCUMENTS

| | | | |
|---|---|---|---|
| 2019/0329176 A1* | 10/2019 | Lu | B01D 53/1475 |
| 2020/0263605 A1* | 8/2020 | Ross | F02C 7/20 |
| 2023/0103018 A1* | 3/2023 | Holck | B01D 53/1475 60/772 |

FOREIGN PATENT DOCUMENTS

| | | | | |
|---|---|---|---|---|
| WO | WO-2014116185 A1 * | 7/2014 | | B63B 35/44 |
| WO | WO 2019/032646 A1 | 2/2019 | | |

* cited by examiner

OFFSHORE CARBON CAPTURE AND INJECTION METHOD AND SYSTEM

PRIORITY CLAIM

This application is a divisional application of U.S. Non-Provisional application Ser. No. 18/497,765, which is a continuation application of U.S. Pat. No. 11,873,991, issued Jan. 16, 2024 (U.S. Non-Provisional application Ser. No. 17/820,639, filed Aug. 18, 2922), which claims the benefit of priority to U.S. Provisional Application No. 63/362,171, filed Mar. 30, 2022, the benefits of which are claimed and the disclosures of which are incorporated by reference in their entireties.

FIELD OF THE INVENTION

The present disclosure generally relates to capture and sequestration of carbon dioxide produced by offshore power production facilities.

BACKGROUND OF THE INVENTION

Carbon dioxide is a common byproduct from the production of power, such as electricity, from hydrocarbons. Traditionally, such carbon dioxide has simply been released into the atmosphere at the power plants where electricity is produced. More recently, attempts have been made to remove or "capture" carbon dioxide from flue gas at these power plants to keep carbon dioxide emissions out of the atmosphere. But separating the captured carbon dioxide gas and storing it can consume a significant percentage of a plant's power-generating capacity. In addition, the captured carbon dioxide must be transported to a facility for long-term storage, such as an underground geological formation, utilizing pipelines, pumping stations, vehicles and the like, all of which further reduces the benefits of capturing the carbon dioxide in the first place. In some instances where the captured carbon dioxide is to be transported by marine vessel, it may be converted locally at the power plant or along the pipeline to a cryogenic liquid, after which it may be loaded onto a marine vessel for transport so a sequestration reservoir. At the reservoir, the carbon dioxide is compressed to reach the pressure required for injection into the reservoir. The liquefaction and transportation of the captured carbon dioxide each have a carbon footprint that reduces the value of the overall effects of capturing the carbon dioxide in the first place.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Disclosed herein is a method and system for capture and geosequestration of carbon dioxide generated from power plants. In particular, a gas fired power plant carried on a marine platform is semi-permanently installed near a carbon dioxide sequestration reservoir. Positioned on the marine platform or on an adjacent marine platform is a carbon dioxide capture system. The flue gas from the power plant is directed to the carbon dioxide capture system, where the carbon dioxide is removed from the flue gas. The removed carbon dioxide is then injected directly into the carbon dioxide sequestration reservoir from the marine platform without the need for storage, liquefaction, transportation, and regasification.

Figure 1:
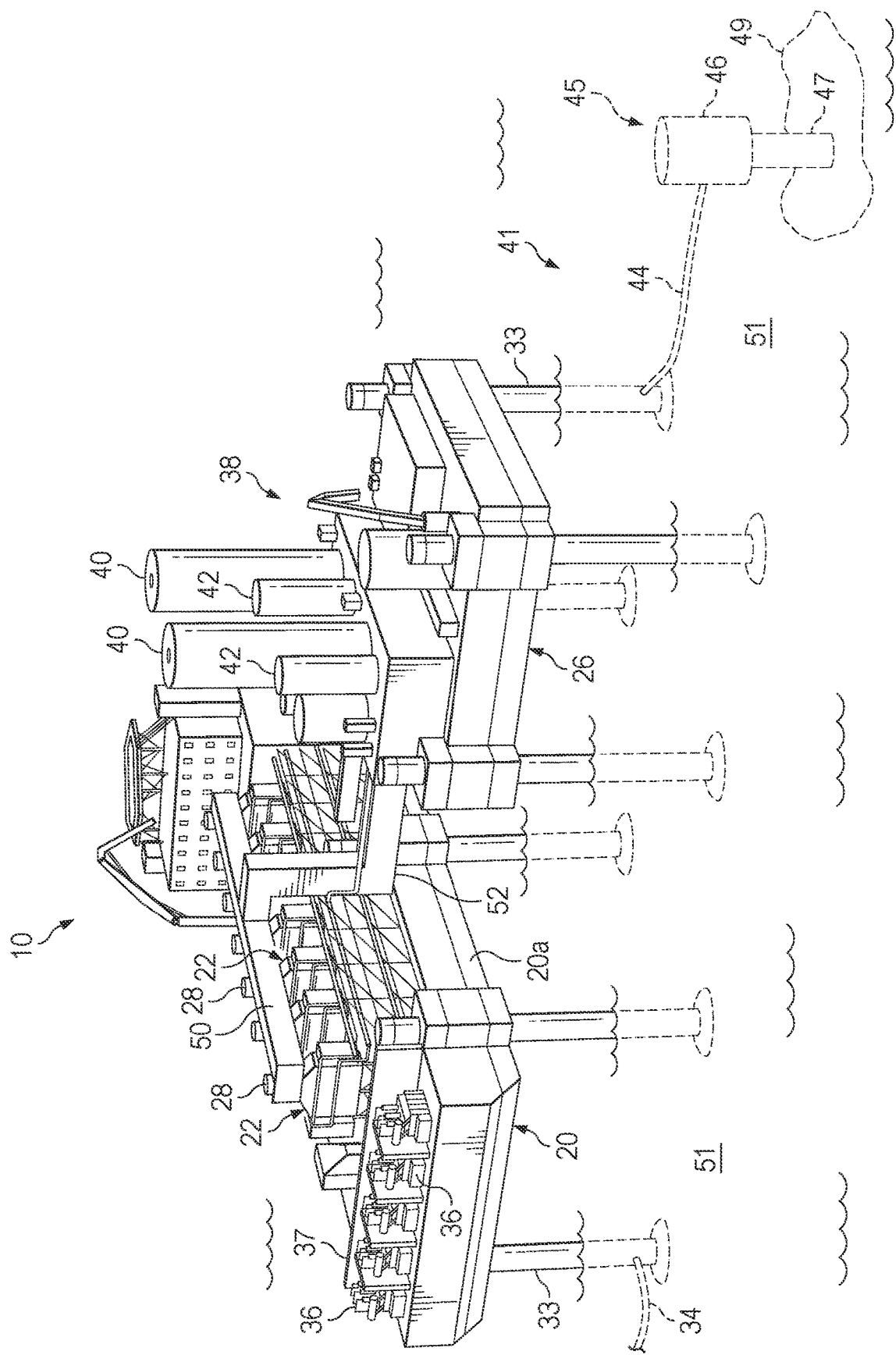
FIG. 1 is a system for electricity generation and carbon capture utilizing adjacent marine platforms.
Figure 2A:
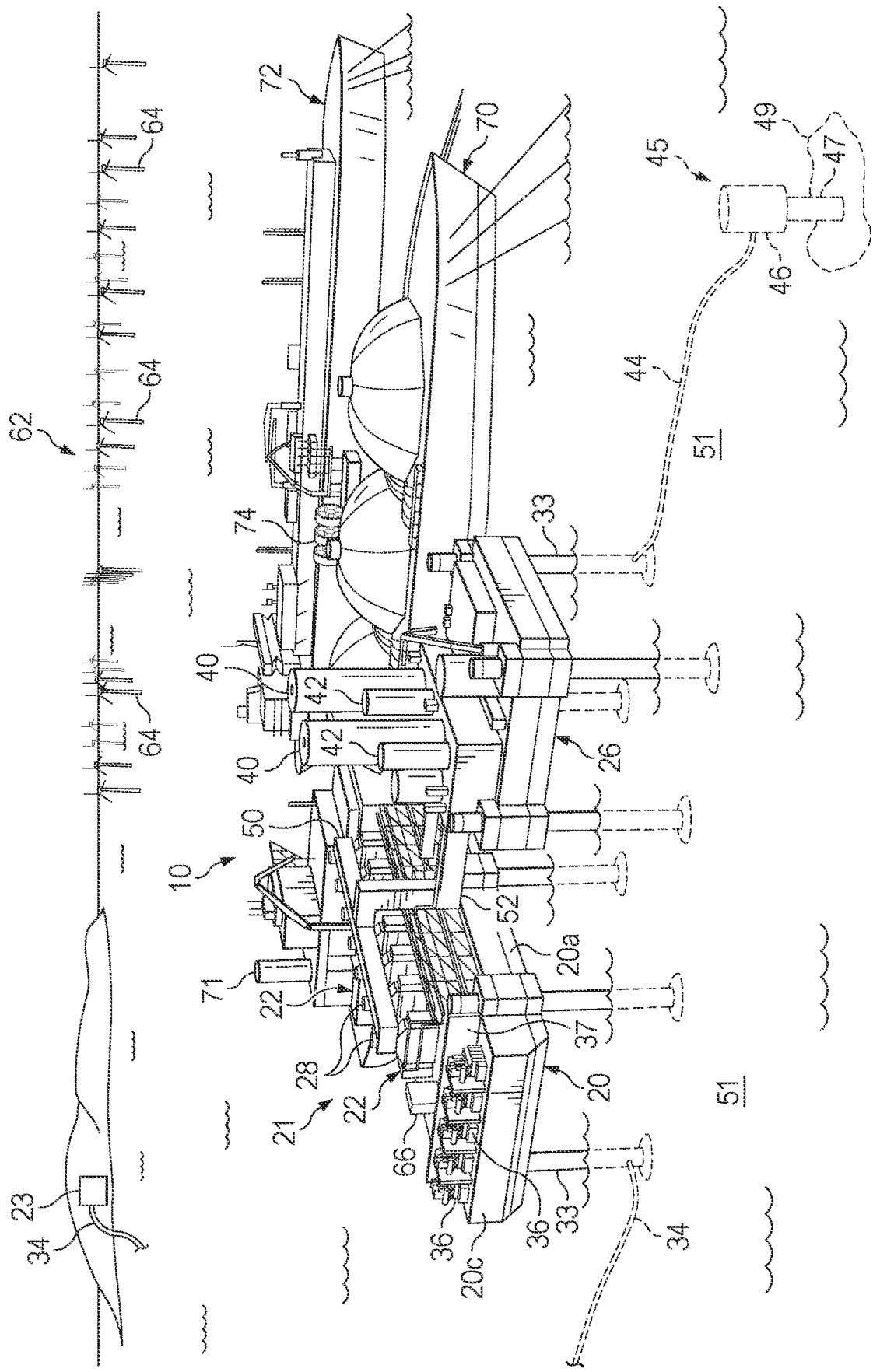
FIG. 2a is the system of FIG. 1 disposed to receive hydrocarbon fuel from a fuel supply vessel.

With reference to FIGS. 1 and 2, a carbon capture and geosequestration system 10 is shown in which is a first marine platform 20 is positioned in the vicinity of a storage reservoir 49 in which carbon dioxide can be injection. The first marine platform 20 includes a power plant 21 having one or more gas fired power generation systems 22. In one or more embodiments, each gas fired power generation system 22 may have 10 MW or more of electric generation capacity, it being understood by persons of skill in the art that this electric generation capacity is generally considered the minimum capacity for generation of electricity at power plants 21 provided for generation and mass distribution of electricity on a power grid, such as the electrical distribution facility 23 shown in FIG. 2. In other embodiments, one or more gas fired power generation systems 22 may have at least a total of 100 MW electric generation capacity. In other embodiments, one or more gas fired power generation systems 22 together may have at least a total of 300 MW electric generation capacity, where each gas fired power generation systems 22 has electric generation capacity of at least 10 MW. In other embodiments, one or more gas fired power generation systems 22 may have between a total of 100-950 MW of electric generation capacity. In yet other embodiments, power plant 21 may include a plurality of gas fired power generation systems 22 with different electrical generation capacities sized to address different loads at different times. In this same vein, the gas fired power generation system 22 as described herein is not limited to a particular type, but may include any type of equipment in which fuel is combusted to generate electricity. In any event, each gas fired power generation system 22 may include a flue gas exhaust 28 for handling of the flue gas that results from combustion of hydrocarbons.

The first marine platform 20 may be a jack-up platform, a semi-submersible platform, a barge, a buoyant vessel, a fixed platform, a spar platform, or a tension-leg platform which is fixed to the ocean floor or otherwise moored for long periods of deployment in a single location, such as 5 months or more. In other embodiments, the marine platform may be a buoyant vessel having an elongated hull with a first hull side and an opposing second hull side, a first hull end and a second hull end that is moored in place for long term deployment. In one or more embodiments, the first marine platform 20 is secured in place for several years up to 20 or more years, it being understood that the power plant 21 carried on the first marine platform 20 is provided to address long term electrical generation needs.

Storage reservoir 49 may be a subsea geologic formation disposed to receive and hold carbon dioxide gas or liquid. Storage reservoir 49 may include depleted or semi-depleted hydrocarbon reservoirs or hydrocarbon reservoirs that have otherwise reached their end of life with respect to hydrocarbon production. While storage reservoir 49 may be located on shore, in preferred embodiments, storage reservoir 49 is located offshore such as is shown in FIG. 1, it being appreciated that an offshore storage reservoir 49 utilized for carbon dioxide sequestration is preferred because of its remoteness and depth when compared to on-shore geologic reservoirs utilized for this purpose. Moreover, utilizing an offshore storage reservoir 49 permits first marine platform 20 to be positioned near the storage reservoir 49, permitting the direct injection of the captured carbon dioxide without the need for long term storage or transportation of carbon dioxide. In this regard, first marine platform 20 may be above an offshore storage reservoir 49 in some embodiments, while in other embodiments, first marine platform 20 may be within 30 kilometers of storage reservoir 49. In other embodiments, first marine platform 20 may be within 20 kilometers of an offshore storage reservoir 49, or a pipeline connected to such reservoir.

Also shown in FIGS. 1 and 2 is a carbon dioxide capture system 38 adjacent the gas fired power generation system(s) 22 and in fluid communication with the flue gas exhaust 28 of the gas fired power generation system(s) 22. While carbon dioxide capture system 38 may be mounted on first marine platform 20 in some embodiments, in other embodiments, as illustrated, carbon dioxide capture system 38 is mounted on a separate marine platform 26 positioned adjacent first marine platform 20 and gas fired power generation system(s) 22. The second marine platform 26 may be similar to the first marine platform 20 described above.

Persons of skill in the art will appreciate that the carbon dioxide capture system 38 need not be limited to a particular system, method or process for carbon dioxide scrubbing. However, in one or more embodiment, a carbon dioxide capture system 38 may include one or more absorber columns 40 in fluid communication with the flue gas exhausts 28 and one or more stripper assemblies 42 (or desorber columns) in fluid communication with the one or more absorber columns 40. Absorber columns 40 may contain a solvent, such as, but not limited to, an amine or potassium carbonate.

Carbon dioxide capture system 38 may include a heat generation system 48 that may be used to produce heat used in stripper assembly 42. The heat may be delivered in the form of steam injection into the stripper assembly 42. As such, carbon dioxide can be removed from the flue gas by introducing the flue gas into an absorber column 40 having liquid solvents, and thereafter, passing saturated liquid solvents from the absorber column 40 into a heated stripper assembly 42 to release carbon dioxide from the saturated liquid solvents. The released carbon dioxide can then be injected into storage reservoir 49 as described.

Thus, in embodiments with two platforms, first marine platform 20 functions as a power generation platform while second marine platform 26 functions as a carbon capture platform.

While some embodiments of carbon capture and geosequestration system 10 are not limited to a particular arrangement, in other embodiments, the gas fired power generation systems 22, transformers 36, and carbon dioxide capture system 38 may be arranged to facilitate flue gas handling and scalability. In one or more embodiments, to facilitate flow of flue gas from the flue gas exhausts 28 of the gas fired power generation system(s) 22, the gas fired power generation systems 22 in some embodiments may be deployed on first marine platform 20 may be generally aligned in a row on first marine platform 20, with an elongated, linear exhaust duct 50 in fluid communication with each of the flue gas exhausts 28, interconnecting two or more flue gas exhausts 28 for transport of the flue gas to the carbon dioxide capture system 38. In this regard, the gas fired power generation systems 22 may be aligned along a first side 20a of the first marine platform 20 with the second marine platform 26 positioned adjacent the first side 20a. A bridging exhaust duct 52 may extend from the elongated linear exhaust duct 50 to the carbon capture system 38 so as to interconnect the exhaust duct 50 with the absorber column(s) 40. It will be appreciated that by aligning the gas fired power generation systems 22 as described, particularly along a side of the first marine platform 20 adjacent which second marine platform 26 (and carbon dioxide capture system 38) is positioned, ducting may be minimized. Additionally, such an arrangement also makes the system more readily scalable.

As described above, one benefit to carbon capture and geosequestration system 10 is the ability to directly inject carbon dioxide into a storage reservoir 49 following removal by the carbon dioxide capture system 38 eliminating the need for local storage vessels or tanks, which is particularly desirable given the limited deck space available on the marine platforms described herein. As such, carbon capture and geosequestration system 10 includes one or more compressor assemblies 43 in fluid communication with the one or more stripper assemblies in order to pressurize the removed carbon dioxide to a pressure required for injection into storage reservoir 49. For example, compressor assembly 43 may pressurize the gaseous carbon dioxide to a desired pressure for purposes of injection, which is likely higher than the pressure of the carbon dioxide exiting the carbon dioxide capture system 38. This may require staged compression utilizing a plurality of compressor assemblies 43. Compressor assembly 43 may be part of carbon dioxide capture system 38 or separate. Compressor assembly 43 may also be carried on second marine platform 26 or otherwise adjacent carbon dioxide capture system 38. As used herein, compressor assembly 43 may include a pump.

Likewise, carbon capture and geosequestration system 10 includes a carbon dioxide conveyance system 41 that extends from the carbon dioxide capture system 38 to a storage reservoir 49. In one or more embodiments, carbon dioxide conveyance system 41 includes a conduit 44 that extends from one of the marine platforms 20, 26 to a carbon dioxide injection system 45. In one or more embodiments, carbon dioxide injection system 45 may include a wellhead 46 that controls fluid flow into a wellbore 47 extending into storage reservoir 49. In other embodiments, carbon dioxide injection system 45 may include a platform (not shown), such as a production platform, associated with storage reservoir 49, such as a drilling and/or production platform previously used in the production of hydrocarbons from storage reservoir 49. In any event, in one or more embodiments, conduit 44 may be a pipeline disposed along the ocean floor 51. However, it will be appreciated that because of the relatively close positioning of marine platform 20 to storage reservoir 49 the length of conduit 44 may be minimized and the pressure required of compressor assembly 43 to move carbon dioxide through conduit 44 to storage reservoir 49 for injection is likewise minimized. However, it will be appreciated that producing and capturing carbon dioxide locally adjacent a storage reservoir 49 and injecting the captured carbon dioxide into the storage reservoir 49 eliminates the need for the carbon dioxide to be transferred to a transportation vehicle (which also avoids carbon footprint from any such transportation vehicle). In this regard, in one or more embodiments, the carbon dioxide loop is closed, in that the carbon dioxide is piped directly from the carbon dioxide capture system 38 to the storage reservoir 49.

In one or more embodiments, the electricity produced by power plant 21 of carbon capture and geosequestration system 10 may be conveyed to an external or remote location, such as the land-based electrical distribution facility 23 shown in FIG. 2, via an electricity conveyance system 34 extending from the first marine platform 20. Electricity conveyance system 34 may be an electric cable deployed along the ocean floor 51. To facilitate conveyance of electricity from first marine platform 20, one or more step-up transformers 36 may be mounted on first marine platform 20. In one or more embodiments, the step-up transformers 36 may have a step-up voltage of 60 to 1,200 kV, while in other embodiments, the step-up transformers 36 may have a step-up voltage of at least 220 kV. In one or more embodiments, step-up transformers 36 may be spaced apart from power plant 21, and any source of combustion fuel for power plant 21, to limit any transformer incident, such as a fire, to spread into gas dangerous zones. Thus, step-up transformers 36 are shown along a separate side 20c of first marine platform 20. In this regard, a fire wall 37 or structure may be erected to further separate step-up transformers 36 from the other various systems of power generation, carbon capture and geosequestration.

In one or more embodiments, one or both of electricity conveyance system 34 and carbon dioxide conveyance system 41 may extend from the deck 39 of a platform 20, 26 to the ocean floor 51 within a leg 33 of a platform 20, 26.

With particular reference to FIG. 2, in one or more embodiments, first marine platform 20 may be positioned near an off-shore wind farm 62, having a multiplicity of wind turbines 64. In such embodiments, the wind turbines 64 may be electrically connected to the first marine platform 20 and/or the second marine platform 26 to provide power thereto. In some embodiments, the wind turbines 64 may be electrically connected to transformers 36 mounted on the first marine platform 20 in order to deliver electricity via electricity conveyance system 34. It will be appreciated that where wind turbines 64 are available to generate electricity, first marine platform 20 may utilize power plant 21 to supplement electricity from wind farm 62 when electrical production from wind farm 62 is down or where demand exceeds electricity from wind farm 62 alone. Thus, first marine platform 20 provides two sources of electricity for delivery via electricity conveyance system 34. To manage electricity from the two sources, first marine platform 20 may include switchgear 66 electrically directly or indirectly connected to each of the power plant 21 and to the multiplicity of wind turbines 64 in order to manage electricity generated by these two sources.

Carbon capture and geosequestration system 10 is not limited to a particular source for combustion fuel for gas fired power generation systems 22. Thus, in one or more embodiments, combustion fuel may be delivered to first marine platform 20 by a pipeline (not shown). In other embodiments, combustion fuel may be delivered via a fuel supply vessel 72 and stored locally at first marine platform 20 in a storage facility 70. In one or more embodiments, a storage facility 70 may be positioned adjacent first marine platform 20 to store and supply hydrocarbon fuel, such as liquified gas (LG), fuel oil or diesel, to the first marine platform and in particular gas fired power generation systems 22. As with first marine platform 20, in one or more embodiments, storage facility 70 may be moored or semi-permanently installed adjacent first marine platform 20 for long periods of time since a continuous supply of hydrocarbon fuel for operation of gas fired power generation systems 22 may be desirable. Storage facility 70 may be a buoyant vessel with one or more fuel cargo tanks 75. In some embodiments, fuel cargo tanks 75 may be cryogenic fuel storage tanks in which a liquified gas may be stored. In the illustrated embodiment, storage facility 70 is a liquefied gas ship with four liquified gas cargo tanks 75. To minimize length of conduit (not shown) supplying hydrocarbon fuel from storage facility 70 to first marine platform 20, storage facility 70 may be positioned adjacent a second side 20b of first marine platform 20, where second marine platform 26 with carbon dioxide capture system 38 positioned adjacent first side 20a of first marine platform 20. In one or more embodiments, the liquefied gas may be liquified natural gas. In one or more embodiments, the liquefied gas may be liquid petroleum gas, liquid ethane, methanol. In any event, in conjunction with local liquefied gas storage, a regasification unit 71 may be disposed on first marine platform 20 to gasify the liquefied gas prior to combustion by the gas fired power generation system(s) 22, and in particular, the internal combustion engine(s) 24 (sec FIG. 5).

It will be appreciated that by positioning one or both of storage facility 70 and carbon capture system 38 adjacent to the respective sides of first marine platform 20, the need for additional or enhanced pumping of hydrocarbon fuel on the one hand and flue gas on the other hand, is minimized. This is particularly desirable in the marine environment described herein. Moreover, in certain embodiments, the carbon dioxide capture system 38 is positioned adjacent first side 20a so as to minimize the distance for fluid communication ducts/conduits between the gas fired power generation system(s) 22 and the carbon dioxide capture system 38. Similarly, storage facility 70 is positioned along second side 20b so as to be readily in fluid communication with the gas fired power generation system(s) 22 via the regasification unit 71, minimizing the length of the conduit 73 used for delivering the liquified gas to the gas fired power generation system(s) 22 and permitting the conduit 73 to be aerial hoses. Moreover, transformers 36 may be positioned along a third side 20c so as to be spaced apart from storage facility 70. Preferably, second side 20b and third side 20c are selected to be at opposing ends of first marine platform 20, with first side 20a positioned therebetween.

In any event, fuel supply vessel 72 may be moored apart from storage facility 70 as shown. Fuel supply vessel 72 is disposed to deliver hydrocarbon fuel to storage facility 70.

Figure 2B:
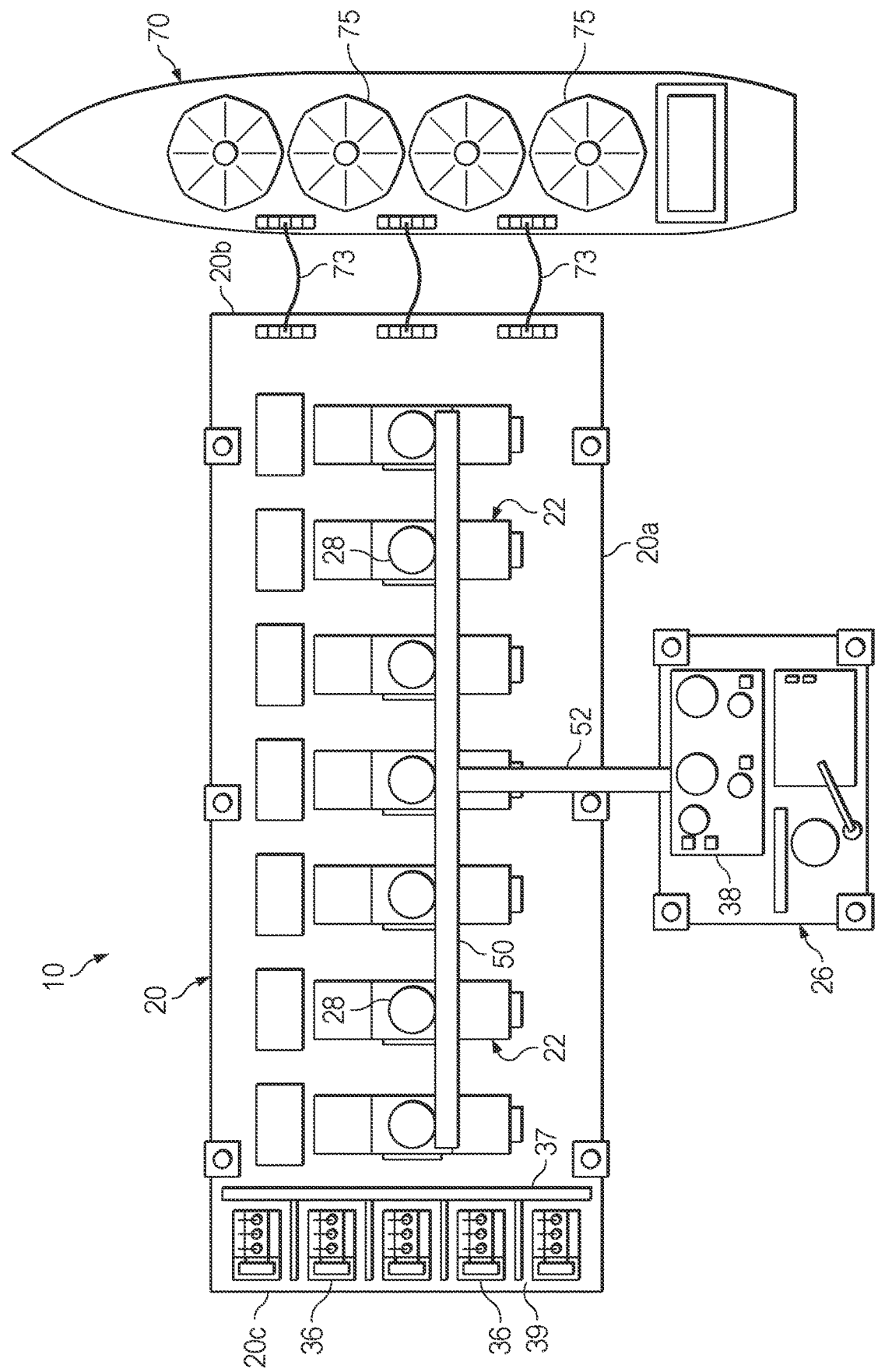
FIG. 2b is the system of FIG. 1, illustrating one arrangement of gas fired power generation systems, transformers, a floating storage facility and a carbon dioxide capture system.
Figure 2C:
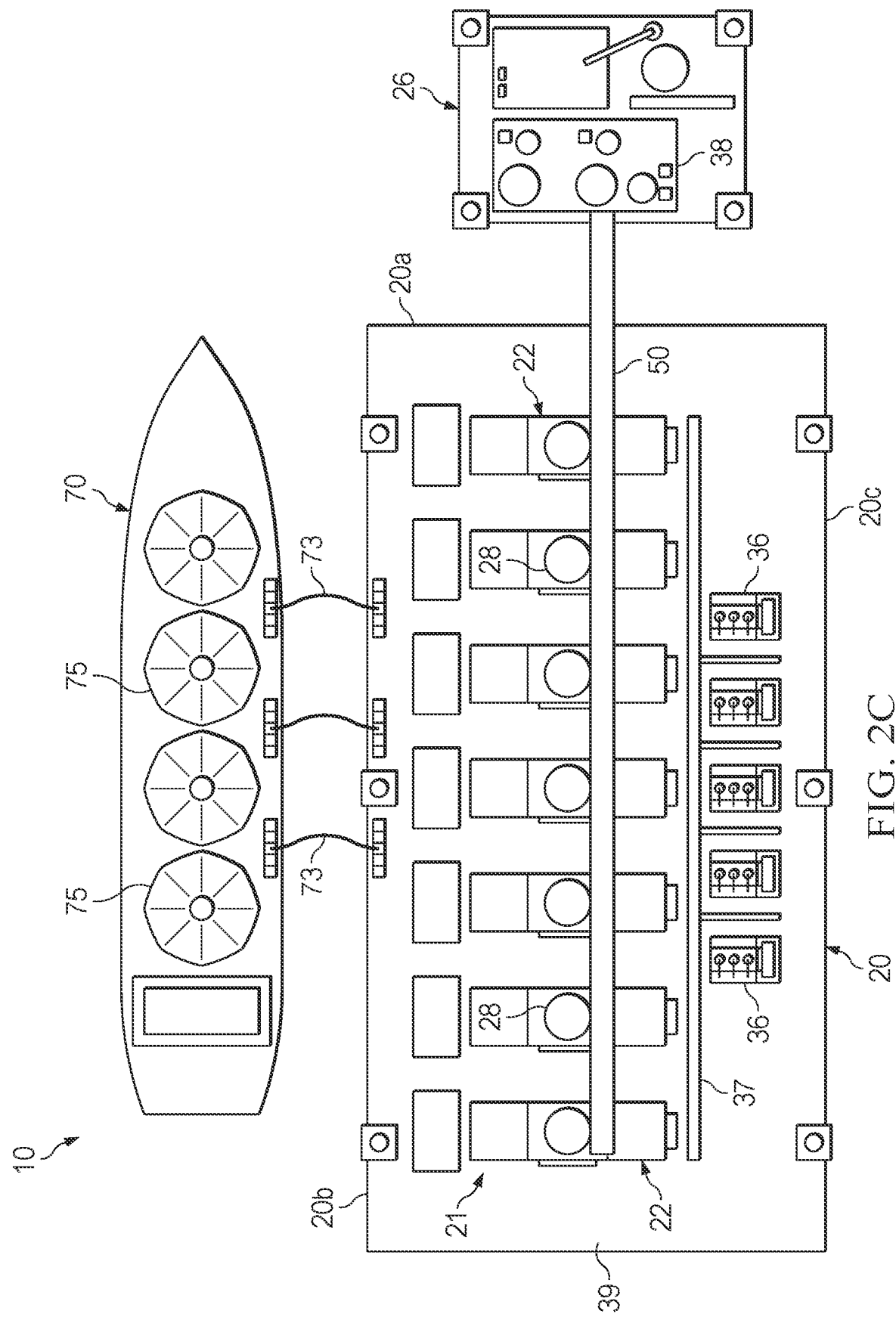
FIG. 2c is the system of FIG. 1, illustrating another arrangement of gas fired power generation systems, transformers, a floating storage facility and a carbon dioxide capture system.

As described above, while some embodiments of carbon capture and geosequestration system 10 are not limited to a particular arrangement, in other embodiments, the gas fired power generation systems 22, transformers 36, floating storage facility 70 and carbon dioxide capture system 38 may be arranged to facilitate flue gas handling and scalability. FIG. 2b illustrates one embodiment of a power plant 21 and carbon dioxide capture system 38 whereby gas fired power generation systems 22 are generally deployed on the deck 39 of first marine platform 20 in a row. This in turn allows the flue gas exhausts 28 to be more readily fluidically coupled to an exhaust duct 50, which, because of the alignment of flue gas exhausts 28, may generally be linear in some embodiments. Also shown in FIG. 2b, first marine platform 20 has a first side 20a along which a second marine platform 26 is positioned, with the carbon dioxide capture system 38 deployed thereon to receive flue gas delivered via a bridging exhaust duct 52 fluidically communicating with elongated exhaust duct 50. First marine platform 20 has a second side 20b and a third side 20c. In one or more embodiments, second side 20b and a third side 20c oppose one another on opposite sides of deck 39, with a floating storage facility 70 positioned adjacent the second side 20b and one or more transformers 36 positioned along the third side 20c, whereby the transformers 36 are positioned as far away from floating storage facility 70 to limit the risk that any sparking or fire at transformers 36 could damage the floating storage facility 70. Similarly, FIG. 2c illustrates another embodiment of a power plant 21 and carbon dioxide capture system 38 whereby gas fired power generation systems 22 are generally deployed on the deck 39 of first marine platform 20 in a row. This in turn allows the flue gas exhausts 28 to be more readily fluidically coupled to an exhaust duct 50, which, because of the alignment of flue gas exhausts 28, may generally be linear in some embodiments. Also shown in FIG. 2b, first marine platform 20 has a first side 20a along which a second marine platform 26 is positioned, with the carbon dioxide capture system 38 deployed thereon to receive flue gas delivered via exhaust duct 50. First marine platform 20 has a second side 20b and a third side 20c. In one or more embodiments, second side 20b and a third side 20c oppose one another on opposite sides of deck 39, with a floating storage facility 70 positioned adjacent the second side 20b and one or more transformers 36 positioned along the third side 20c, whereby the transformers 36 are positioned as far away from floating storage facility 70 to limit the risk that any sparking or fire at transformers 36 could damage the floating storage facility 70.

In one or more embodiments, a semi-submersible connection unit 74 may be disposed between fuel supply vessel 72 and storage facility 70. The connection unit 74 is provided to allow connection of tubing 76 to a fuel supply manifold 12 on the vessel 72 for offloading of hydrocarbon fuel from the vessel 72 through the tubing 76 to storage facility 70. In this way, first marine platform may be supplied with a continuous or semi-continuous supply of fuel without the need for interrupting operation of gas fired power generation systems 22 during delivery of hydrocarbon fuel by fuel supply vessel 72.

Figure 3:
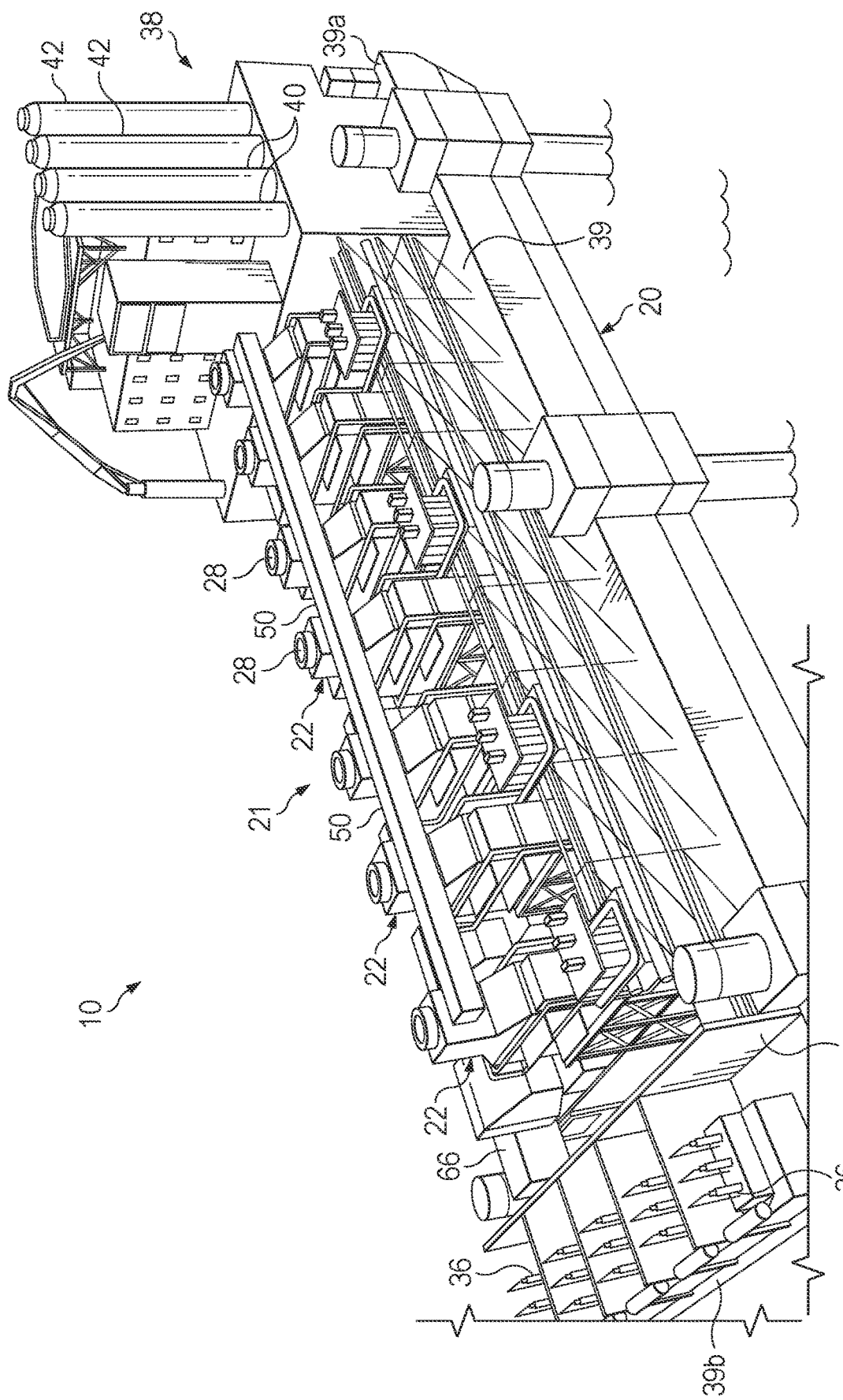
FIG. 3 is a system for electricity generation and carbon capture on a single marine platform.

With reference to FIG. 3, the power plant 21 and carbon dioxide capture system 38 as described above are shown mounted on a single marine platform 20. Power plant 21 may have one or more gas fired power generation systems 22. In the illustrated embodiment, power plant 21 include seven gas fired power generation systems 22 shown. As described above, although the disclosure is not limited to a particular arrangement of gas fired power generation systems 22, in some embodiments, gas fired power generation systems 22 may be aligned in a row thereby allowing an elongated, linear exhaust duct 50 to be in fluid communication with a flue gas exhaust 28 from each gas fired power generation system 22. In the illustrated embodiment, exhaust duct 50 directs flue gas to a carbon dioxide capture system 38. Likewise, although not limited to a particular arrangement, in one or more embodiments, first marine platform 20 may have an elongated deck 39 with a carbon dioxide capture system 38 positioned on one end 39a of deck 39 and step-up transformers 36 positioned on an opposite end 39b of deck 39 with a plurality of aligned gas fired power generation systems 22 disposed therebetween. As used herein, "linear" means extending generally in the same direction.

In this embodiment, carbon dioxide capture system 38 includes absorber columns 40 in fluid communication with the flue gas exhausts 28 (via duct 50) and one or more stripper assemblies 42 in fluid communication with the absorber columns 40.

Figure 4:
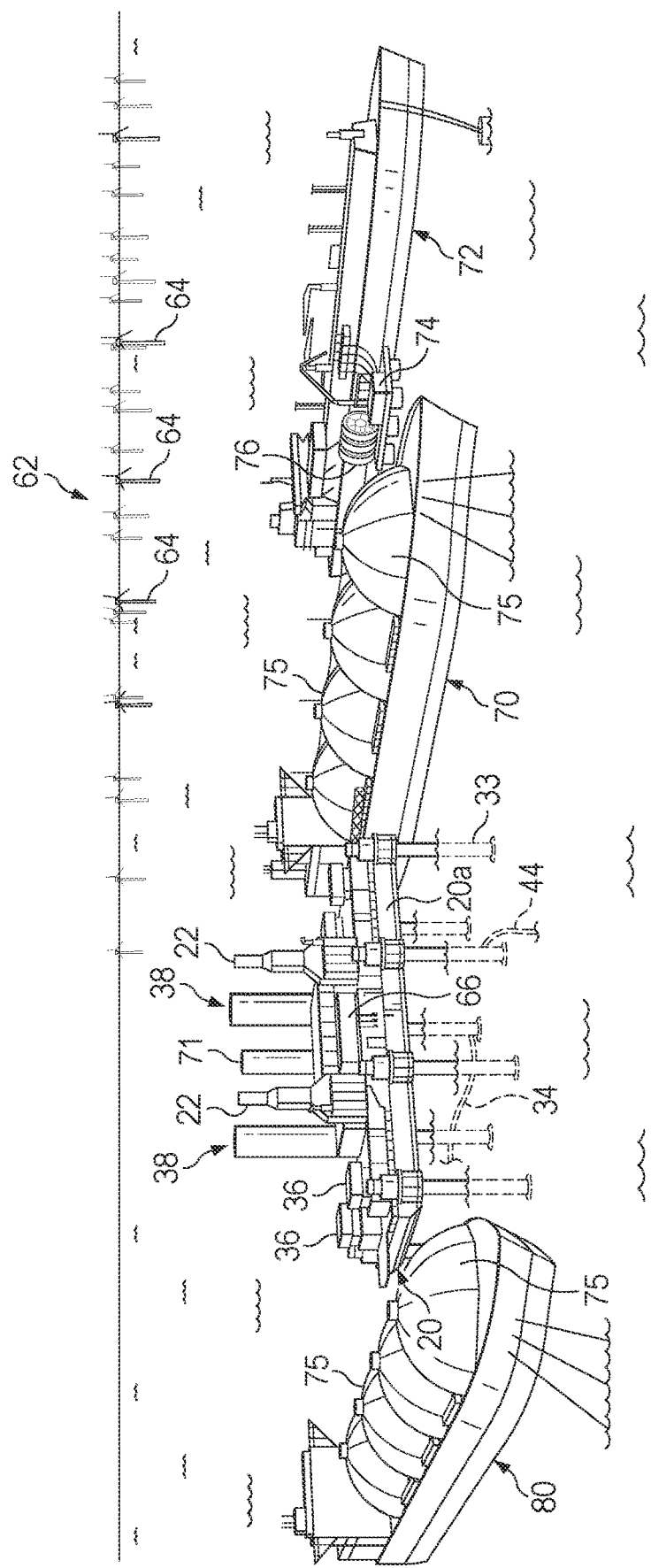
FIG. 4 is a system for offshore electricity generation utilizing wind turbines and gas fired power generation systems.

FIG. 4 is similar to FIG. 3 in that power plant 21 and carbon dioxide capture system 38 are shown mounted on a single marine platform 20. In this embodiment, wind farm 62 having a multiplicity of wind turbines 64 is shown in the vicinity of marine platform 20. Likewise, FIG. 4 illustrates combustion fuel delivered via a fuel supply vessel 72 and stored locally at first marine platform 20 in a storage facility 70. Storage facility 70 is positioned adjacent first marine platform 20 to store and supply hydrocarbon fuel, such as liquified natural gas (LNG) to the first marine platform and in particular gas fired power generation systems 22. A semi-submersible connection unit 74 is disposed between fuel supply vessel 72 and storage facility 70 to allow connection of tubing 76 to fuel supply vessel 72 for offloading of hydrocarbon fuel from the vessel 72 through the tubing 76 to storage facility 70.

While some embodiments contemplate direct injection of carbon dioxide produced from carbon dioxide capture system 38, in other embodiments, a local, temporary storage tank for removed carbon dioxide produced by carbon dioxide capture system 38 or supplied from a source external to marine platform 20 may be provided for temporary storage until a sufficient volume of carbon dioxide has been produced to achieve a desired capacity for injection via conduit 44. For example, as shown in FIG. 4, carbon dioxide from carbon dioxide capture system 38, or supplied for injection from a source external to marine platform 20, may be stored locally in a storage facility 80. In one or more embodiments, a storage facility 80 may be positioned adjacent carbon dioxide capture system 38 (whether on first marine platform 20 or second marine platform 26). A source external to marine platform 20 may include a pipeline (not shown) delivering carbon dioxide to marine platform 20 or a marine cargo vessel (not shown) delivering carbon dioxide to marine platform 20. Storage facility 80 may be moored or semi-permanently installed adjacent a marine platform 20, 26 for long periods of time since a large volume of carbon dioxide for injection into reservoir 49 may be desirable for an injection operation. Storage facility 80 may be a buoyant vessel with one or more cargo tanks 75 in which carbon dioxide may be stored prior to injection. Moreover, storage facility 80 may also function as a gathering point for gaseous carbon dioxide supplied from third party sources, which third party gaseous carbon dioxide can be combined with the carbon dioxide captured from power plant 21 prior to injection into reservoir 49.

Utilizing storage facility 80, carbon capture and geosequestration system 10 may also function as a hub for reservoir access, thereby receiving carbon dioxide from transportation vehicles such as a vessel 72 or via pipeline, and thereafter storing carbon dioxide received in smaller volumes in storage facility 80 until sufficient volume has been received for injection into reservoir 49 utilizing compressor assemblies 43, it being appreciated that establishing such injection facilities may be cost prohibitive for smaller producers of carbon dioxide.

Figure 5:
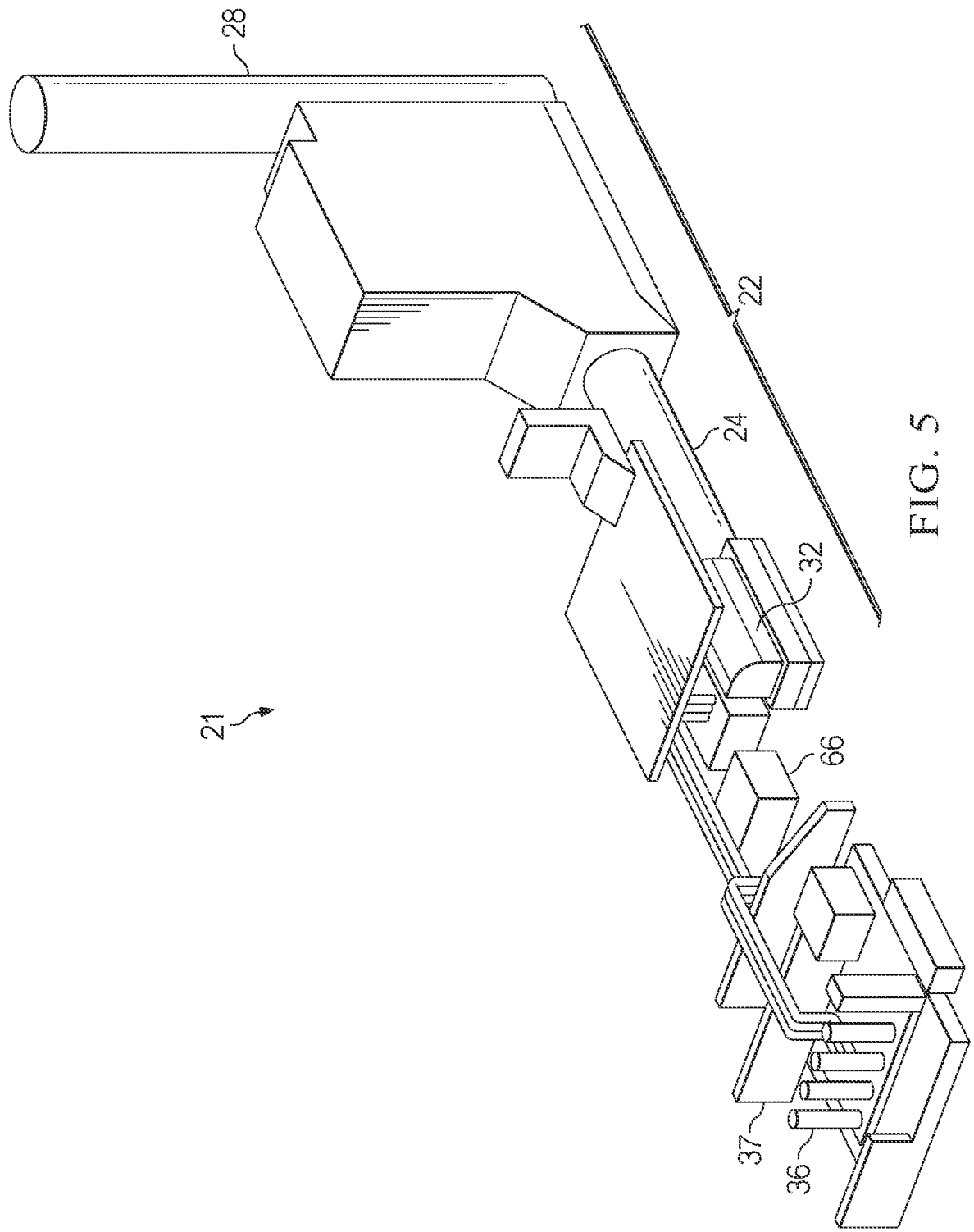
FIG. 5 is a gas fired electricity production power plant as may be mounted on a marine platform in accordance with the disclosure.

Although power plant 21 is not limited to a particular configuration, FIG. 5 illustrates one example of a gas fired power generation system 22. As shown, gas fired power generation system 22 includes an internal combustion engine 24 to which combustion fuel is supplied. For example, combustion fuel may be supplied from a storage facility 70 or a fuel supply vessel 72 as described above. In any event, flue gas from internal combustion engine 24 is directed to an flue gas exhaust 28. Internal combustion engine 24 drives an electric generator 32 to produce electricity which is directed to step-up transformers 36. Switchgear 66 may be provided to manage the electricity from gas fired power generation system 22 and/or other sources, such as wind turbines 64 (see FIG. 2). In one or more embodiments, each internal combustion engine 24 drives one or more electric generators 32. As such, in some embodiments, a power plant 21 with a plurality of internal combustion engines 24 may also include a corresponding plurality of electric generators 32. To further assist in the management of electricity at first platform 20, one or more transformers 36 may be provided. Transformers 36 may be utilized to step-up the electricity produced from electric generators 32 and/or wind turbines (not shown) for transmission to locations remote form first platform 20. In one or more embodiments, transformers 36 may be spaced apart from the gas fired power generation system 22 in order to minimize interaction of the transformers with other components and equipment of the power plant 21. In one or more embodiments, internal combustion engine 24 may be a piston engine, while in one or more embodiments, internal combustion engine 24 may be a gas turbine engine. Thus, power plant 21 may include a plurality of gas turbine engines to drive electric generators 32, or a plurality of piston engines to drive electric generators 32, or may include both gas turbine engines and piston engines disposed to drive a plurality of electric generators 32.

Figure 6:
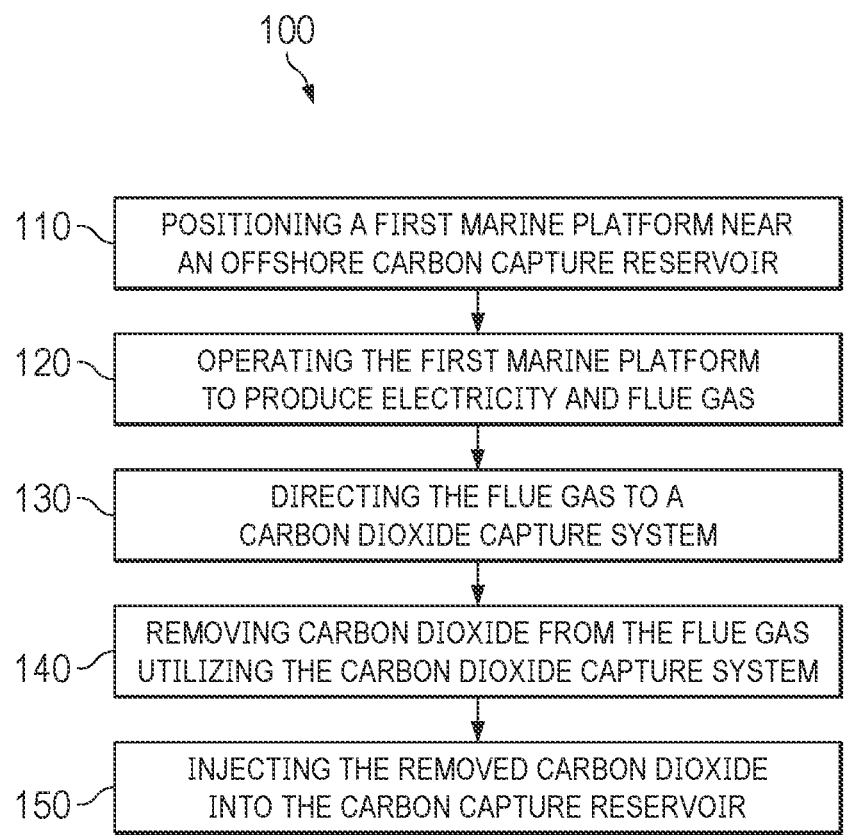
FIG. 6 is a method for electricity generation and carbon capture on a single marine platform.

Turning to FIG. 6, an electricity generation and carbon capture method 100 is illustrated. In a first step 110, a first marine platform, such as first marine platform 20, is positioned near an offshore subsea reservoir, such a hydrocarbon reservoir that is depleted or has reached its end of life. In one or more embodiments, the first marine platform may be positioned on the ocean floor (or moored on the ocean surface) above the reservoir. In other embodiments, the first marine platform may be positioned within the general vicinity of the subsea reservoir. In some embodiments, the first marine platform may be positioned within 20-30 kilometers of the subsea reservoir, or a pipeline connected to such reservoir.

In a second step 120, the first marine platform may be utilized to generate electricity through the combustion of hydrocarbon fuel. This may be accomplished utilizing a power plant installed on the first marine platform. In particular, gas turbine engines and/or piston engines of the power plant may be utilized to operate one or more electric generators to produce electricity. The hydrocarbon fuel is not limited to a particular type of combustion fuel, and may include natural gas, hydrogen, gasoline, diesel fuel, bunker fuel or the like, all of which produce flue gas when combusted.

In step 130, the flue gas is directed to a carbon dioxide capture system. The carbon dioxide capture system may be located on the first marine platform, or may located on a second marine platform installed or moored adjacent the first marine platform. Ducting may be utilized to direct the flue gas from flue gas exhausts of the power plant to the carbon dioxide capture system.

In step 140, carbon dioxide is removed from the flue gas by the carbon dioxide capture system. Although the disclosure is not limited to a particular method for removing carbon dioxide from the flue gas, in one or more embodiments, the flue gas may be introduced into one or more absorber columns which absorber columns may include a solvent therein that interacts with flue gas passing through the column to absorb carbon dioxide within the flue gas. The solvent is selected based on its ability to absorb carbon dioxide. In one or more embodiments, the solvent may an amine or potassium carbonate. As is known in the art, typically an absorber column is a vertical column with a packed bed disposed therein. Gas to be cleaned, such as flue gas, is introduced in a lower portion of the column and rises through the packed bed. A fluid solvent, typically in the liquid state, is introduced in an upper portion of the column and flows down through the packed bed, interacting with the rising flue gas in the packed portion of the column. The cleaned gas, in this case, flue gas stripped of an amount of carbon dioxide, exits the column adjacent the upper portion of the column and the liquid solvent exits the column adjacent the lower portion of the column. Thereafter the carbon dioxide may be removed from the solvent for further handling.

In one or more embodiments, the saturated or carbon dioxide rich liquid solvent from the absorber column is directed to a stripper assembly where the solvent is interacted with heat to produce a gaseous fluid of carbon dioxide water vapor. This gaseous fluid can be passed through a condenser to separate gaseous carbon dioxide from the water vapor, leaving gaseous carbon dioxide for further handling as described herein.

In step 150, carbon dioxide removed from the flue gas is injected into a carbon capture reservoir. As described above, in one or more embodiments, the carbon dioxide may be injected directly from the one of the marine platforms directly into a carbon capture reservoir, eliminating the need to transport the carbon dioxide to another location. In some embodiments, the carbon dioxide may be injected into the carbon capture reservoir in a continuous process as it is scrubbed from the flue gas, while in other embodiments, the carbon dioxide may be temporarily stored at the marine platform and injected into the carbon capture reservoir in batches. In the latter case, it may be necessary to collect a minimum volume of carbon dioxide before injection is feasible or desirable.

Figure 7:
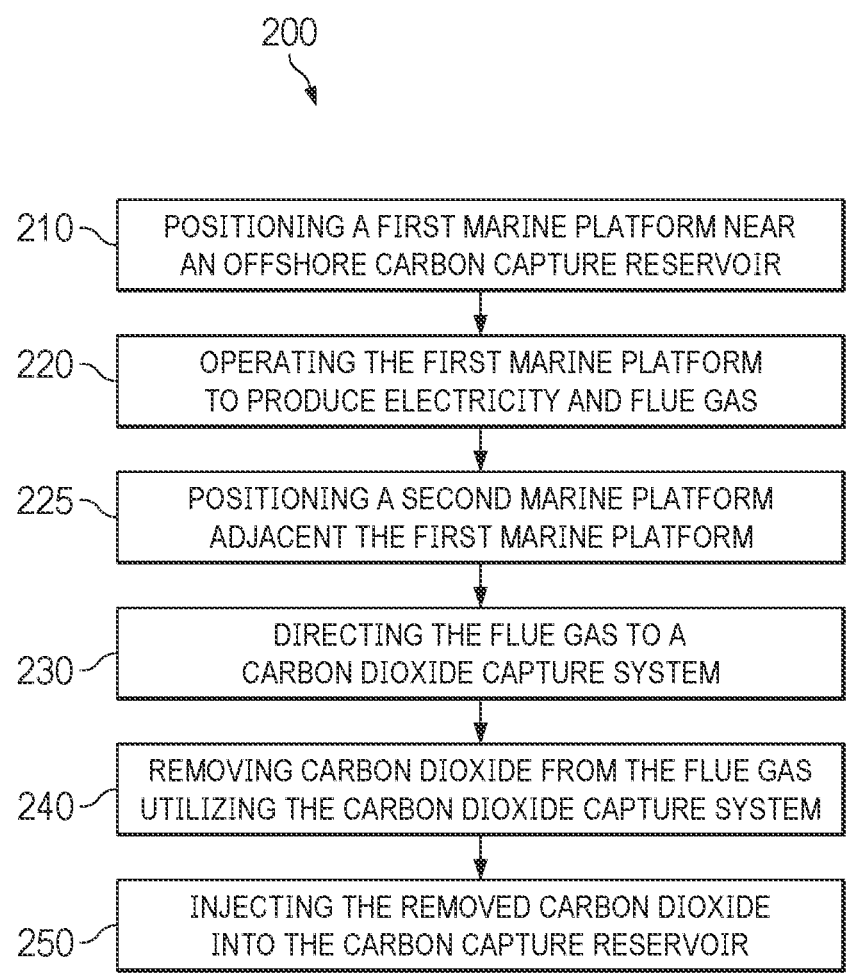
FIG. 7 is a method for electricity generation and carbon capture utilizing adjacent marine platforms.

Turning to FIG. 7, an electricity generation and carbon capture method 200 is illustrated similar to method 100 wherein, in a first step 210, a first marine platform, such as first marine platform 20, is positioned near an offshore subsea reservoir, such a hydrocarbon reservoir that is depleted or has reached its end of life.

In a second step 220, the first marine platform may be utilized to generate electricity through the combustion of hydrocarbon fuel, which combustion results in the production of carbon dioxide bearing flue gas.

In step 225, a second marine platform, such as second marine platform 26, is positioned adjacent the first marine platform. Positioning of the two flatforms is selected so processes on the second marine platform may be coordinated in conjunction with processes on the first marine platform, such as the production of electricity and flue gas. In one or more embodiments, the second marine platform may be positioned on the ocean floor adjacent the first marine platform, or otherwise, moored for long term deployment adjacent the first marine platform.

In step 230, the flue gas is directed to a carbon dioxide capture system on the second marine platform.

In step 240, carbon dioxide is removed from the flue gas by the carbon dioxide capture system. In one or more embodiments, the resulting carbon dioxide is in the form of gaseous carbon dioxide.

In step 250, carbon dioxide removed from the flue gas is injected into a carbon capture reservoir. In one or more embodiments, the carbon dioxide may be injected directly from the second marine platform into a carbon capture reservoir. This direct injection may be a continuous process or may be a batch process as a desired volume of carbon dioxide is removed by carbon dioxide capture system.

Figure 8:
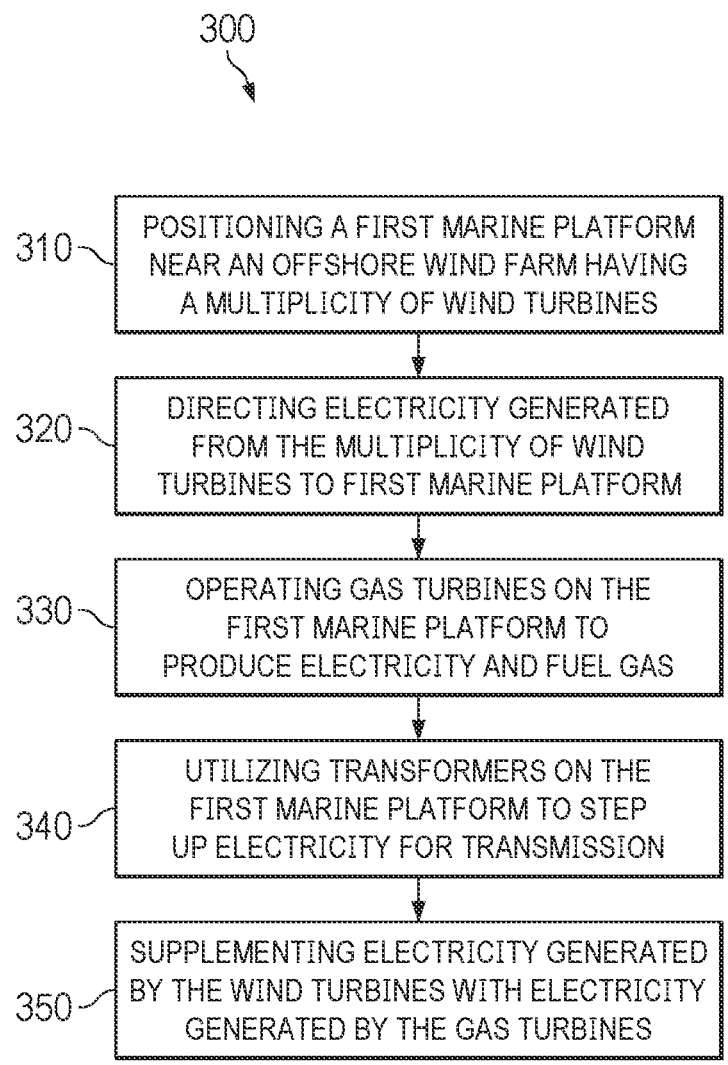
FIG. 8 is a method for offshore electricity generation utilizing wind turbines and gas fired power generation systems.

Turning to FIG. 8, an electricity generation method 300 is illustrated. In a first step 310, a marine platform, such as first marine platform 20, is positioned near an offshore wind farm having a multiplicity of wind turbines. Wind turbines as referenced herein are not limited to a particular type, but are generally provided to produce electricity arising from a rotating component driven by offshore wind. In one or more embodiment, the wind turbines may be tower mounted.

In a step 320, the electricity produced from the wind farm and in particular, the multiplicity of wind turbines, is directed to the first marine platform for collection, management and distribution.

In a step 330, the marine platform may be utilized to generate electricity through the combustion of hydrocarbon fuel. This may be accomplished utilizing a power plant installed on the marine platform. In particular, gas turbine engines and/or piston engines of the power plant may be utilized to operate one or more electric generators to produce electricity. The hydrocarbon fuel is not limited to a particular type of combustion fuel, and may include natural gas, hydrogen, diesel fuel, bunker fuel or the like, all of which produce flue gas when combusted.

In step 340, transformers on the marine platform may be utilized manage electricity at the platform by stepping up the electricity from the wind turbines and/or the electricity from the power plant for transmission to a location that is remote from the marine platform, such as a land-based electrical distribution facility or grid. In this regard, electrical conduit or power lines may extend along the seabed from the marine platform to such location.

In step 350, in order to meet demand at the remote location, electricity from the wind turbines may be supplemented with electricity from the power plant, or alternatively, electricity from the power plant may be supplemented with electricity from the wind turbines. In one or more embodiments, electricity from the wind turbines may be the primary source of electricity transmitted to the remote location, and as demand rises, the power plant may be selectively operated to produce additional electricity to meet any demand that cannot be met with just electricity form the wind turbines alone. This may occur, for example, at times where offshore wind is not driving the wind turbines at a required speed for a desired amount of electricity production.

Figure 9:
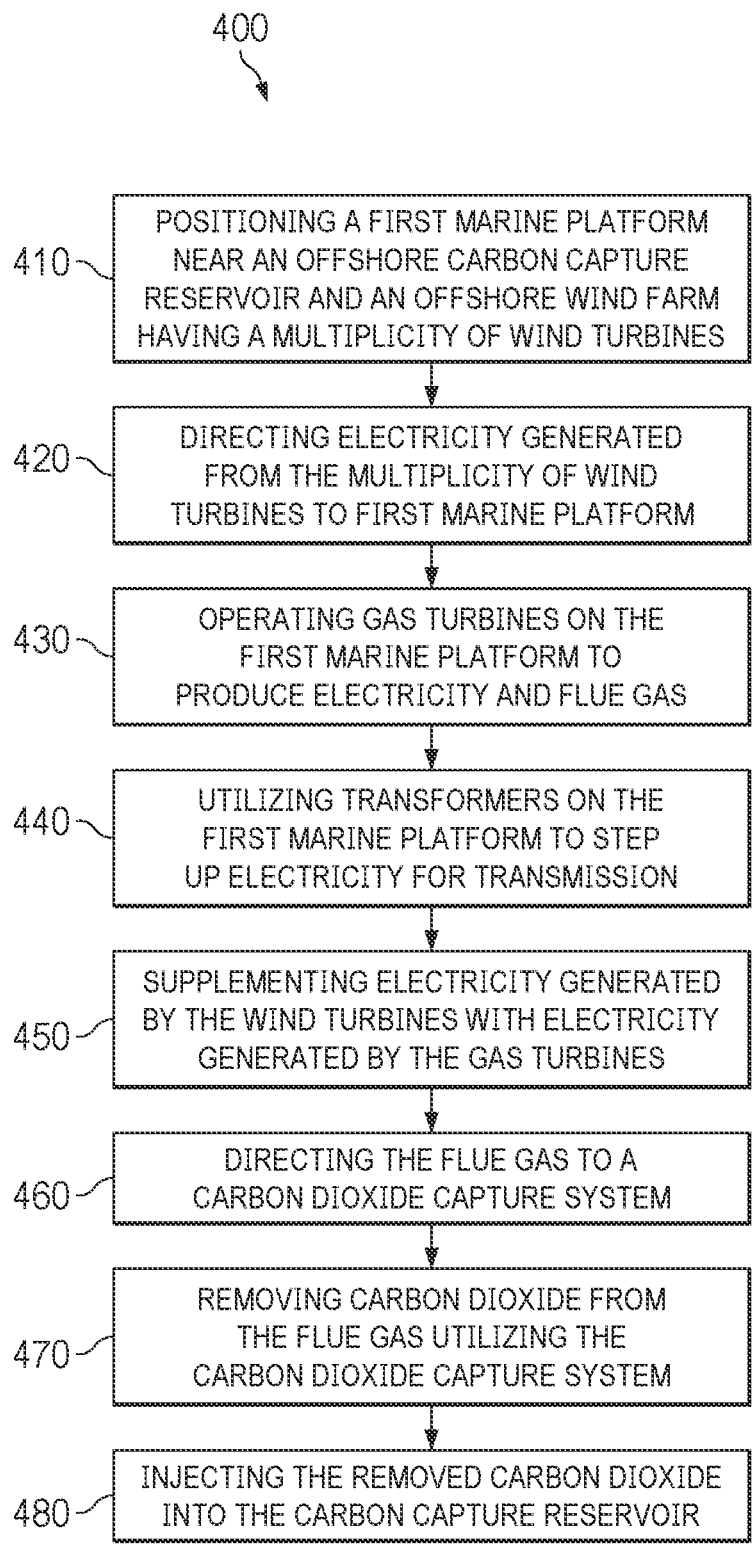
FIG. 9 is a method for electricity generation and carbon capture utilizing wind turbines and gas fired power generation systems.

With reference to FIG. 9, another electricity generation method 400 is illustrated. In a first step 410, a marine platform, such as first marine platform 20, is positioned near an offshore subsea reservoir and near an offshore wind farm having a multiplicity of wind turbines. The offshore reservoir may be a subsea hydrocarbon reservoir that is depleted or has reached its end of life. In one or more embodiments, the marine platform may be positioned on the ocean floor (or moored on the ocean surface) above the reservoir. In other embodiments, the marine platform may be positioned within the general vicinity of the subsea reservoir. In some embodiments, the marine platform may be positioned within 20-30 kilometers of the subsea reservoir, or a pipeline connected to such reservoir. The wind turbines as referenced herein are not limited to a particular type, but are generally provided to produce electricity arising from a rotating component driven by offshore wind. In one or more embodiment, the wind turbines may be tower mounted.

In a step 420, the electricity produced from the wind farm and in particular, the multiplicity of wind turbines, is directed to the marine platform for collection, management and distribution.

In a second step 430, the marine platform is utilized to generate electricity through the combustion of hydrocarbon fuel. This may be accomplished utilizing a power plant installed on the marine platform. In particular, gas turbine engines and/or piston engines of the power plant may be utilized to operate one or more electric generators to produce electricity, as well as flue gas from the combustion of hydrocarbons by the power plant.

In step 440, transformers on the marine platform may be utilized manage electricity at the platform by stepping up the electricity from the wind turbines and/or the electricity from the power plant for transmission to a location that is remote from the marine platform, such as a land-based electrical distribution facility or grid. In this regard, electrical conduit or power lines may extend along the seabed from the marine platform to such location.

In step 450, in order to meet demand at the remote location, electricity from the wind turbines may be supplemented with electricity from the power plant, or alternatively, electricity from the power plant may be supplemented with electricity from the wind turbines, as needed. In one or more embodiments, electricity from the wind turbines may be the primary source of electricity transmitted to the remote location, and as demand rises, the power plant may be selectively operated to produce additional electricity to meet any demand that cannot be met with just electricity form the wind turbines alone. This may occur, for example, at times where offshore wind is not driving the wind turbines at a required speed for a desired amount of electricity production.

In step 460, the flue gas from the power plant is directed to a carbon dioxide capture system adjacent the power plant. The carbon dioxide capture system may be located on the marine platform, or may located on another marine platform installed or moored adjacent the marine platform on which the power plant is installed. Ducting may be utilized to direct the flue gas from flue gas exhausts of the power plant to the carbon dioxide capture system.

In step 470, carbon dioxide is removed from the flue gas by the carbon dioxide capture system. In one embodiment, the flue gas may be directed to one or more absorber columns where a solvent removes carbon dioxide from the flue gas. Thereafter, the saturated or carbon dioxide rich solvent from the absorber column may be directed to a stripper assembly where the solvent is interacted with heat to produce a gaseous fluid of carbon dioxide water vapor. This gaseous fluid can be passed through a condenser to separate gaseous carbon dioxide from the water vapor, leaving gaseous carbon dioxide for further handling as described herein.

In step 480, carbon dioxide removed from the flue gas is injected into a carbon capture storage reservoir. As described above, in one or more embodiments, the carbon dioxide may be injected directly from the one of the marine platforms directly into a subsea storage reservoir, eliminating the need to transport the carbon dioxide to another location. In some embodiments, the carbon dioxide may be injected into the carbon capture reservoir in a continuous process as it is scrubbed from the flue gas, while in other embodiments, the carbon dioxide may be temporarily stored at the marine platform and injected into the carbon capture reservoir in batches. In the latter case, it may be necessary to collect a minimum volume of carbon dioxide before injection is feasible or desirable.

One benefit of the described method and system is that it eliminates the need to transport carbon dioxide. Typically, when carbon dioxide results from land-based gas fired power plants, the flue gas is first directed to a carbon dioxide capture system in order to remove the carbon dioxide from the flue gas. The removed carbon dioxide is then liquified and stored on land by cooling and compression until it can be transported over land via tanker trucks to a dock where the liquified carbon dioxide is then loaded onto a suitable marine vessel and transported out to an injection site where the liquified carbon dioxide is transferred into a temporary storage, then further compressed before injection into a subsea reservoir. Those of skill in the art will appreciate that the need to liquefy, store, transport (often by both land and sea) and store and then further compress the carbon dioxide adds significantly to the cost of carbon geosequestration, and hence the cost of the electricity produced in association with the carbon dioxide. For example, an additional logistics cost of 100 USD/ton may increase the cost of 1 kilowatt of electricity by 3.5 USc/kwh.

To remove the need to store, transport and regasify carbon dioxide produced in flue gas from electricity generation, in one or more embodiments described herein, a power plant is positioned offshore near an undersea carbon dioxide storage reservoir. The power plant, and in particular, the gas fired power generation systems carried by a first marine platform, is fixed or moored to the ocean floor or otherwise installed for long term power generation. A carbon dioxide capture system is also carried by the first marine platform, or alternatively, by a second marine platform installed adjacent the first marine platform. In the case of the latter, as with the first marine platform, the second marine platform is installed for long term deployment, and thus may be fixed to the ocean floor or otherwise buoyed to operate in conjunction with the power plant. It will be appreciated that the carbon dioxide capture system is not limited to a particular type of carbon capture arrangement. It will be appreciated the power plant as contemplated herein is disposed for to generate power for consumer consumption, and thus may generally be rated at 10 MW or more. Likewise, because the electricity is being generated offshore, it must be transmitted longer distances in order to connect to the power grid, and thus may step-up voltages to 60$k$ V or more the first marine platform. However, the benefits of eliminating the need and expense for storage and transportation of carbon dioxide greatly offset the potentially longer transmission distances.

An additional benefit to the above-described arrangement regards fuel input for the power production. Almost all LNG in larger quantities is transported by ship. By placing the marine platform terminal, power generation and carbon dioxide capture facilities where these ships can readily offload, the logistics cost with respect to fuel delivery are reduced, as well as the associated carbon footprint.

Thus, an offshore power generation system has been described herein. In one or more embodiments, the offshore power generation system may include a first marine platform; at least one gas fired power generation system with more than 10 MW of electric generation capacity mounted on the first marine platform, each gas fired power generation system including a flue gas exhaust; an electricity conveyance system extending from the first marine platform, the electricity conveyance system disposed to supply consumer power external to the first marine platform; a carbon dioxide capture system adjacent the at least one gas fired power generation system and in fluid communication with the flue gas exhaust of the at least one gas fired power generation system; and a carbon dioxide conveyance system extending from the carbon dioxide capture system. In other embodiments, the offshore power generation system may include a first marine platform; a plurality of internal combustion engines mounted on the first marine platform, each internal combustion engine including a flue gas exhaust; a plurality of electric generators mounted on the first marine platform and driven by the plurality of internal combustion engines; an electricity conveyance system extending from the first marine platform; a multiplicity of wind turbines; an electrical power collection system mounted on the first marine platform and electrically connected to the multiplicity of wind turbines; and one or more transformers mounted on the first marine platform and electrically connected to the electrical power collection system. Other embodiments of the offshore power generation system include a first marine platform; a plurality of gas turbine engines mounted on the first marine platform, each gas turbine engine including a flue gas exhaust; a plurality of electric generators mounted on the first marine platform and driven by the plurality of gas turbine engines; an electricity conveyance system extending from the first marine platform; a carbon dioxide capture system adjacent the gas fired power generation systems and in fluid communication with the flue gas exhausts of the plurality of gas fired power generation systems; and a carbon dioxide conveyance system extending from the carbon capture system. Other embodiments of the offshore power generation system include a first marine platform; at least one internal combustion engine mounted on the first marine platform, each internal combustion engine including a flue gas exhaust; a plurality of electric generators mounted on the first marine platform and driven by the at least one internal combustion engine; an electricity conveyance system extending from the first marine platform; a carbon dioxide capture system adjacent the gas fired power generation systems and in fluid communication with the flue gas exhausts of the plurality of gas fired power generation systems; and a carbon dioxide conveyance system extending from the carbon capture system. Other embodiments of the offshore power generation system include a first marine platform; a plurality of gas fired power generation systems mounted on the first marine platform, each gas fired power generation system including a flue gas exhaust; a plurality of electric generators mounted on the first marine platform; an electricity conveyance system extending from the first marine platform; a second marine platform adjacent the first marine platform; a carbon dioxide capture system mounted on the second marine platform and in fluid communication with the flue gas exhausts of the plurality of gas fired power generation systems; and a carbon dioxide conveyance system extending from the carbon capture system, wherein the carbon dioxide conveyance system is a conduit extending from the carbon capture system to a carbon dioxide injection wellhead. Other embodiments of the offshore power generation system include a first marine platform; a plurality of internal combustion engines mounted on the first marine platform, each internal combustion engine including a flue gas exhaust; a plurality of electric generators mounted on the first marine platform; an electricity conveyance system extending from the first marine platform; a carbon dioxide capture system mounted on the marine platform and in fluid communication with the flue gas exhausts of the plurality of internal combustion engines; and a carbon dioxide conveyance system extending from the marine platform. Other embodiments of the offshore power generation system include a first marine platform; a plurality of internal combustion engines mounted on the first marine platform, each internal combustion engine including a flue gas exhaust; a plurality of electric generators mounted on the first marine platform; a power cable extending from the first marine platform for conveyance of electricity generated by the plurality of electric generators; a second marine platform; a carbon dioxide capture system mounted on the second marine platform and in fluid communication with the flue gas exhausts of the plurality of internal combustion engines; a carbon dioxide injection wellhead; and a carbon dioxide conveyance system extending from the second marine platform to the carbon dioxide injection wellhead. Other embodiments of the offshore power generation system include a first marine platform; a plurality of gas turbine engines mounted on the first marine platform, each gas turbine engine including a flue gas exhaust; a plurality of electric generators mounted on the first marine platform; an electricity conveyance system extending from the first marine platform; a multiplicity of wind turbines; an electrical power collection system mounted on the first marine platform and electrically connected to the multiplicity of wind turbines; and one or more transformers mounted on the first marine platform and electrically connected to the electrical power collection system.

Any of the foregoing offshore power generation systems may further include, alone or in combination, any of the following:

The gas fired power generation system comprises an internal combustion engine and an electric generator driven by the internal combustion engine.

The internal combustion engine comprises a gas turbine engine.

The internal combustion engine comprises a piston engine.

The plurality of internal combustion engines comprises one or more gas turbine engines and one or more piston engines.

The plurality of internal combustion engines comprises one or more gas turbine engines and one or more piston engines, where each of the gas turbine engines and piston engines drives an electric generator.

The at least one gas fired generator is of a 300-650 MW of electric generation capacity.

A plurality of gas fired power generation systems, which plurality of gas fired power generation systems have a total electric generation capacity of 300-650 MW.

A plurality of gas fired power generation systems, which plurality of gas fired power generation systems have a total electric generation capacity of at least 100 MW, where each gas fired generator has a capacity of at least 10 MW.

The at least one gas fired generator is of a 100-950 MW of electric generation capacity.

A plurality of gas fired power generation systems, which plurality of gas fired power generation systems have a total electric generation capacity of 100-950 MW.

The at least one gas fired generator has a total capacity of at least 300 MW of electric generation capacity, where each gas fired generator has a capacity of at least 10 MW.

Each of the plurality of gas fired power generation systems are of at least 10 MW of electric generation capacity.

The gas fired power generation system comprises a gas turbine engine.

The gas fired power generation system comprises a piston engine.

The gas fired power generation system comprises at least one gas turbine engine and at least one electric generator driven by the at least one gas turbine engine.

The first marine platform is a power generation marine platform.

The second marine platform is a carbon capture marine platform.

The first marine platform is both a power generation marine platform and a carbon capture marine platform.

Each marine platform is one of a jack-up platform, a semi-submersible platform, a barge, a buoyant vessel, a fixed platform, a spar platform, or a tension-leg platform.

The marine platform is a buoyant vessel having an elongated hull with a first hull side and an opposing second hull side, a first hull end and a second hull end.

The carbon capture system comprises one or more absorber columns in fluid communication with the flue gas exhausts; one or more stripper assemblies (or desorber columns) in fluid communication with the one or more absorber columns; and a compressor assembly in fluid communication with the one or more stripper assemblies.

The electricity conveyance system is an electric cable.

A carbon dioxide injecting system in fluid communication with the carbon dioxide conveyance system extending from the carbon dioxide capture system.

The carbon dioxide injecting system comprises a wellhead in fluid communication with a wellbore extending into a carbon capture reservoir.

The carbon dioxide conveyance system is a conduit extending from the carbon capture system to the wellhead.

The absorber column contains a solvent.

The solvent is an amine.

The solvent is potassium carbonate.

The stripper assembly includes a heat generation system.

The plurality of internal combustion engines are aligned linearly on the first marine platform.

The plurality of internal combustion engines are aligned linearly along a first side of the first marine platform.

The second marine platform is adjacent the first marine platform.

The second marine platform is adjacent the first side of the first marine platform.

An elongated, linear exhaust duct in fluid communication with each of the flue gas exhausts.

An elongated exhaust duct in fluid communication with two or more flue gas exhausts.

A bridging exhaust duct extending from the elongated linear exhaust duct to the carbon capture system.

At least one of the exhaust ducts is in fluid communication with an absorber column.

A multiplicity of wind turbines; an electrical power collection system mounted on the first marine platform and electrically connected to the multiplicity of wind turbines; and one or more transformers mounted on the first marine platform and electrically connected to the electrical power collection system.

A plurality of step-up transformers mounted on the first marine platform.

The step-up transformers have a step-up voltage of 60 to 1,200 kV.

The step-up transformers have a step-up voltage of at least 220 kV.

Likewise, a method for electricity generation has been described. The electricity generation method may include positioning a first marine platform near an offshore storage reservoir; operating a plurality of internal combustion engines on the first marine platform to produce electricity and flue gas; directing the flue gas to a carbon dioxide capture system; removing carbon dioxide from the flue gas utilizing the carbon dioxide capture system; and injecting the removed carbon dioxide into the storage reservoir. Other embodiments of the electricity generation method may include positioning a first marine platform near an offshore wind farm having a multiplicity of wind turbines; directing electricity produced from the multiplicity of wind turbines to first marine platform; operating a plurality of gas turbine engines on the first marine platform to produce electricity and flue gas; utilizing transformers on the first marine platform to step up electricity from the wind turbines and gas turbine engines for transmission; and supplementing electricity produced by one type of turbine with electricity produced by the other type of turbine. Still other embodiments of the electricity generation method may include positioning a first marine platform near an offshore carbon capture reservoir; operating a plurality of internal combustion engines on the first marine platform to produce electricity and flue gas; directing the flue gas to a carbon dioxide capture system; removing carbon dioxide from the flue gas utilizing the carbon dioxide capture system; and injecting the removed carbon dioxide into the carbon capture reservoir. Still other embodiments of the electricity generation method may include positioning a first marine platform near an offshore carbon capture reservoir; operating a plurality of internal combustion engines on the first marine platform to produce electricity and flue gas; positioning a second marine platform adjacent the first marine platform; directing the flue gas to a second marine platform; removing carbon dioxide from the flue gas on the second marine platform; and injecting the removed carbon dioxide into the carbon capture reservoir. Still other embodiments of the electricity generation method may include positioning a first marine platform near an offshore wind farm having a multiplicity of wind turbines; directing electricity generated from the multiplicity of wind turbines to first marine platform; operating a plurality of internal combustion engines on the first marine platform to produce electricity and flue gas; utilizing transformers on the first marine platform to step up electricity for transmission; and supplementing electricity generated by the wind turbines with electricity generated by the plurality of internal combustion engines. Still other embodiments of the electricity generation method may include positioning a first marine platform near an offshore carbon capture reservoir and an offshore wind farm having a multiplicity of wind turbines; directing electricity generated from the multiplicity of wind turbines to first marine platform; operating gas fired power generation systems on the first marine platform to produce electricity and flue gas; utilizing transformers on the first marine platform to step up electricity for transmission; supplementing electricity generated by the wind turbines with electricity generated by the gas fired power generation systems, wherein the step of supplementing comprises: directing the flue gas produced from the gas fired generation systems to a carbon dioxide capture system; removing carbon dioxide from the flue gas utilizing the carbon dioxide capture system; and injecting the removed carbon dioxide into the carbon capture reservoir.

Any of the foregoing embodiments of a method for electricity generation may include alone or in combination, any of the following:

Operating internal combustion engines comprises operating a plurality of gas turbine engines.

Operating internal combustion engines comprises operating a plurality of piston engines.

Operating internal combustion engines comprises operating one or more piston engines and one or more gas turbine engines.

Removing carbon dioxide from the flue gas comprises introducing the flue gas into an absorber column having liquid solvents; and thereafter, passing saturated liquid solvents from the absorber column into a heated stripper assembly to release carbon dioxide from the saturated liquid solvents; and thereafter, injecting the released carbon dioxide into the offshore carbon capture reservoir.

Providing heat to the stripper by injecting steam into the stripper assembly.

Carbon dioxide is pumped directly from the second marine platform into the offshore carbon capture reservoir.

Carbon dioxide is pumped directly from the carbon dioxide capture system into the offshore carbon capture reservoir.

Injecting comprises pumping carbon dioxide directly from the second marine platform into the carbon capture reservoir.

Injecting comprises pumping carbon dioxide into a conduit extending from the second marine platform to the carbon capture reservoir.

Injecting comprises pumping carbon dioxide into a wellbore extending into the carbon capture reservoir.

Positioning a first marine platform near an offshore carbon capture reservoir comprises positioning a first marine platform above an offshore carbon capture reservoir.

Positioning a first marine platform near an offshore carbon capture reservoir comprises positioning a first marine platform within 30 kilometers of an offshore carbon capture reservoir.

Positioning a first marine platform near an offshore carbon capture reservoir comprises positioning a first marine platform within 20 kilometers of an offshore carbon capture reservoir.

Operating the first marine platform to produce electricity and flue gas comprises utilizing a plurality of gas turbine engines on the first marine platform to drive a plurality of electric generators on the first marine platform.

Supplying combustion fuel from a floating storage facility to the internal combustion engines of the first marine platform.

Delivering combustion fuel from a marine transport vessel to a floating storage facility moored adjacent the first marine platform.

Supplying combustion fuel comprises delivering gas to the first marine platform via a pipeline.

Supplying combustion fuel comprises delivering gas to the first marine platform utilizing LG ships moored in the vicinity of the first marine platform.

Positioning a first marine platform near an offshore wind farm having a multiplicity of wind turbines and near an offshore carbon capture reservoir.

Capturing carbon dioxide from flue gas produced by the plurality of gas turbine engines and injecting the captured carbon dioxide directly into an offshore carbon capture reservoir.

The first or second marine platform also acts as a receiving platform for carbon dioxide transported in ships from other carbon capture plants, for the purpose of injecting the carbon dioxide into a carbon capture reservoir.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. An offshore power generation system comprising:
   a fixed marine platform having at least a first side, a second side and a third side;
   a plurality of gas fired power generation systems mounted on the marine platform, the plurality of gas fired power generation systems each having more than 10 MW of electric generation capacity, and each having a flue gas exhaust;
   a carbon dioxide capture system mounted on the marine platform and in fluid communication with the flue gas exhausts of each of the plurality of gas fired power generation systems;
   a carbon dioxide conveyance system extending from the carbon dioxide capture system to a carbon dioxide storage system;
   a combustion fuel source disposed adjacent the first side of the marine platform and in fluid communication with the plurality of gas fired power generation systems;
   a plurality of step-up transformers mounted on the marine platform adjacent the third side of marine platform; and
   an electricity conveyance system extending away from the plurality of step-up transformers on the marine platform, the electricity conveyance system disposed to supply consumer power external to the marine platform;
   wherein the plurality of gas fired power generation systems are positioned on the marine platform between the combustion fuel source adjacent the first side of the marine platform and the plurality of step-up transformers adjacent the third side of marine platform.

2. The system of claim 1, wherein each of the plurality of gas fired power generation systems comprises
   an internal combustion engine having a flue gas exhaust; and
   an electric generator driven by the internal combustion engine.

3. The system of claim 2, wherein the carbon dioxide conveyance system is a conduit extending from the carbon capture system to adjacent a carbon dioxide injection wellhead in fluid communication with a subsea storage reservoir.

4. The system of claim 1, wherein the plurality of gas fired power generation systems has a total electric generation capacity of at least 100 MW.

5. The system of claim 1, wherein each of the plurality of step-up transformers has a step-up voltage of at least 220 kV.

6. The system of claim 1, wherein the carbon capture system comprises one or more absorber columns in fluid communication with the flue gas exhausts; one or more stripper assemblies in fluid communication with the one or more absorber columns; and a compressor assembly in fluid communication with the one or more stripper assemblies, wherein the one or more absorber columns contain a solvent selected from the group consisting of an amine and potassium carbonate.

7. The system of claim 1, wherein each of the plurality of gas fired power generation systems are gas turbine engines.

8. The system of claim 1, wherein the combustion fuel source is a liquified gas floating storage facility storing liquified gas and moored adjacent the first side of the marine platform.

9. The system of claim 1, further comprising an elongated, linear exhaust duct extending linearly between the first and third sides of the marine platform and in fluid communication with each of the flue gas exhausts.

10. The system of claim 1, further comprising a fire wall separating the plurality of step-up transformers from plurality of gas fired power generation systems.

11. The system of claim 1, wherein the combustion fuel source is a pipeline in fluid communication with the marine platform adjacent the first side of the marine platform.

12. The system of claim 1, further comprising a floating carbon dioxide storage system moored adjacent the marine platform.

13. The system of claim 12, wherein the floating carbon dioxide storage system is in fluid communication with the carbon dioxide conveyance system.

14. An offshore power generation system comprising:
   a marine platform, wherein the first marine platform has at least a first side, a second side and a third side;
   a plurality of gas fired power generation systems mounted on the marine platform, each gas fired power generation system including a flue gas exhaust;
   a plurality of electric generators mounted on the marine platform and driven by the plurality of gas fired power generation systems;
   a combustion fuel source in fluid communication with the plurality of gas fired power generation systems;
   a plurality of step-up transformers mounted on the marine platform adjacent the third side, wherein the plurality of step-up transformers each have a step-up voltage of at least 60 kV;
   an electricity conveyance system extending away from the plurality of step-up transformers on the marine platform, the electricity conveyance system disposed to supply consumer power external to the marine platform;
   a carbon dioxide capture system mounted on the marine platform adjacent the first side and in fluid communication with the flue gas exhausts of the plurality of gas fired power generation systems; and
   a carbon dioxide conveyance system extending from the carbon dioxide capture system to a storage reservoir;

wherein the plurality of gas fired power generation systems are positioned on the marine platform between the carbon dioxide capture system adjacent the first side of the marine platform and the plurality of step-up transformers adjacent the third side of marine platform.

15. The system of claim 1, further comprising a floating carbon dioxide storage system moored adjacent the marine platform and in fluid communication with the carbon dioxide conveyance system.

16. An offshore power generation system comprising:
a first marine platform, wherein the first marine platform has at least a first side, a second side and a third side opposing and spaced apart from the first side;
a plurality of gas turbine engines mounted on the first marine platform, each gas turbine engine including a flue gas exhaust;
an elongated, linear exhaust duct in fluid communication with each of the flue gas exhausts, the elongated, linear exhaust duct extending linearly between the first and third sides of the first marine platform;
a plurality of electric generators mounted on the first marine platform and driven by the plurality of gas turbine engines;
a plurality of step-up transformers mounted adjacent the third side of the first marine platform; and
an electricity conveyance system extending away from the plurality of step-up transformers on the first marine platform, the electricity conveyance system disposed to supply consumer power external to the first marine platform;
a combustion fuel source disposed adjacent the first side of the first marine platform and in fluid communication with the plurality of gas turbine engines;
a carbon dioxide capture system in fluid communication with the elongated, linear exhaust duct; and
a carbon dioxide conveyance system extending from the carbon dioxide capture system to a storage reservoir;
wherein the plurality of gas turbine engines are positioned on the first marine platform between the combustion fuel source adjacent the first side of the first marine platform and the plurality of step-up transformers adjacent the third side of first marine platform.

17. The system of claim 16, further comprising a floating carbon dioxide storage system moored adjacent the marine platform and in fluid communication with the carbon dioxide conveyance system.

18. The system of claim 16, wherein the combustion fuel source is a liquified gas floating storage facility moored adjacent the first side of the first marine platform.

19. The system of claim 16, further comprising a second marine platform adjacent the second side of the first marine platform, wherein the carbon dioxide capture system is mounted on the second marine platform.

* * * * *